(No Model.)

A. H. LOEBS.
TRIPOD.

No. 578,998. Patented Mar. 16, 1897.

Witnesses:
H. R. Hallock.
S. J. Williamson.

Inventor
Albert H. Loebs.
By Geo. H. Holgate
Attorney.

United States Patent Office.

ALBERT H. LOEBS, OF ROCHESTER, NEW YORK.

TRIPOD.

SPECIFICATION forming part of Letters Patent No. 578,998, dated March 16, 1897.

Application filed April 24, 1896. Serial No. 588,988. (No model.)

*To all whom it may concern:*

Be it known that I, ALBERT H. LOEBS, a citizen of the United States, residing at Rochester, in the county of Monroe and State of New York, have invented certain new and useful Improvements in Tripods, of which the following is a specification.

My invention relates to a new and useful improvement in tripods for photographic purposes and the like, and has for its object to so construct such a tripod as to permit of the setting of the camera at any angle from the horizontal to the vertical without removing any parts thereof and yet when it is desired to remove the camera from the tripod to greatly facilitate this removal, and also to improve upon the construction of the legs of the tripod, so that they may be more readily adjusted and made stronger from a given weight of the material than has heretofore been the case.

With these ends in view my invention consists in the details of construction and combination of elements hereinafter set forth and then specifically designated by the claim.

In order that those skilled in the art to which this invention appertains may understand how to make and use the same, I will describe its construction and operation in detail, referring to the accompanying drawings, forming a part of this specification, in which—

Figure 1:
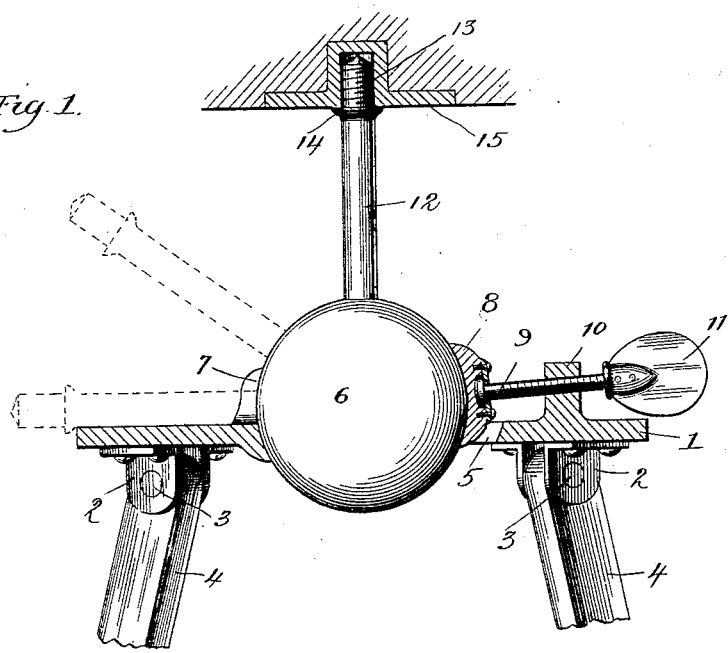
Figure 2:
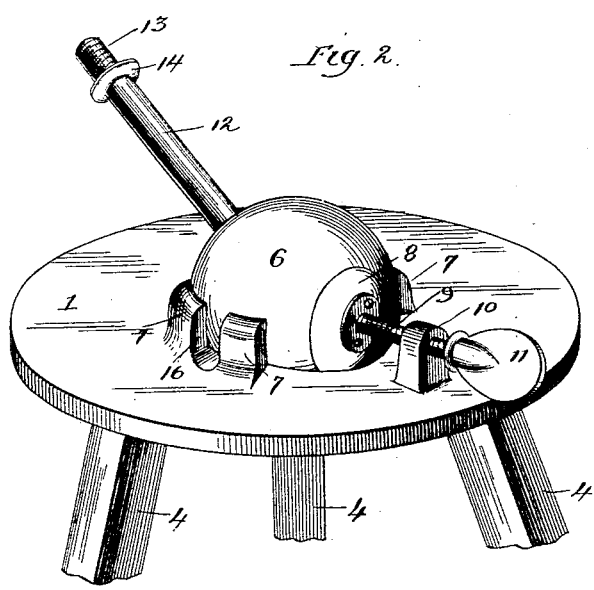

Figure 1 is a section of the head of the tripod, showing the legs pivoted thereto and illustrating the application of my improved universally-adjustable camera-support and the means employed for securing the latter in any desired adjustment; Fig. 2, a perspective of the head and support; and Fig. 3, a detailed perspective of the lower portion of one of the legs of the tripod, showing its construction.

Referring to the drawings in detail, 1 represents the head of the tripod, which consists of a disk preferably cast in suitable shape and having depending therefrom the ears 2, in which is pivoted at 3 the upper portion of the legs 4. These legs of course are three in number and adapted to be adjusted radially, so as to bring the upper surface of the head within the horizontal plane.

The opening 5 is formed through the center of the head and of sufficient size to receive the sphere 6, and 7 are lugs projecting upward from the top of the head, and their inner surfaces being of a contour adapted to fit the contour of the sphere, so that when the latter is placed within the opening and brought to bear against said surfaces it will be firmly held in position upon the axis of the tripod, and this is brought about by the shoe 8, which is concaved upon its inner surface, thereby being adapted to fit the contour of the sphere, and to this shoe is swiveled the screw 9, which is threaded through the lug 10, and 11 is a thumb-piece by means of which the screw may be manipulated to force the shoe against the sphere for the purpose before described.

12 is a rod secured to the sphere and projecting therefrom radially, having its upper end threaded at 13, below which is a flange 14. The threaded end of the rod 12 is adapted to engage with suitable threads formed in the socket 15, secured upon the under side of any design of camera. Thus it will be seen that a camera so supported may be adjusted to any angle from the horizontal to the vertical in any plane.

Now it will be seen that a camera mounted upon my improved tripod may, without being removed therefrom or the removal of any part of either the tripod or camera, be so adjusted as to take a negative upon almost any desired angle, and this is of great advantage in certain classes of photographic work, in that it permits of the taking of a picture upon the sensitized plate either lengthwise or crosswise or diagonally thereof, and, as is understood in this art, such an arrangement enables the photographer to take a full-length picture upon a much smaller plate than would otherwise be possible. Another advantage of this construction is that in a camera using a wide-angled lens such camera may be adjusted so that the lens will take any portion of the scene desired without the alteration of the legs of the tripod, thus enabling the photographer to quickly accomplish that which has heretofore required great skill and involved much difficulty. Still a further advantage gained by this construction is that when used in connection with cameras not provided with reversible backs such a camera may be easily swung to either the horizontal or the vertical, which heretofore required the removal of the camera from the head and the replacing thereon at right angles to its first position. Also an advantage gained by this construction is that a camera may be removed and attached to its tripod with little or no effort and within a very small space of time by removing the sphere from its bearings without detaching the camera from the supporting-rod.

Under some circumstances it is desirable to lock the camera in its horizontal position, and this I accomplish by forming a slot 16 in the lugs 7, adapted to receive the rod 12, so that when said rod is turned into one of these slots and the sphere bound by the shoe, as before described, it is obvious that the camera will be held against accidental displacement, even though the tripod be transported from one place to another in taking several views in the same locality. When it is desired to pack the tripod and camera into a small compass, it is obvious that the support, consisting of the rod 12 and sphere 6, may be removed from the head by backing off the screw, and when again required for use may be quickly replaced, and when so replaced will be properly located by the adaptation of the sphere to the concaved surfaces upon the lugs and shoe.

Figure 3:
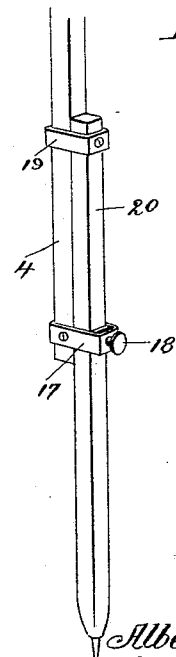

To the lower ends of the legs 4 are secured the straps 17, in which is threaded the thumb-screw 18, and 19 are straps secured to the adjustable legs 20 and adapted to embrace the legs 4, so that when said adjustable legs are arranged relative to the legs 4, as shown in Fig. 3, it will be seen that they may be adjusted vertically upon the said legs 4 and held in any adjustment by the thumb-screw 18. This form of legs permits of the adjustment of the tripod so as to level up the head thereon in the usual manner, and a leg so constructed may be made of the desired strength with less weight of material than is possible with the usual form of legs.

In practice it is customary to level the camera by adjusting the legs of the tripod to the surface upon which the tripod stands, but when my improved tripod is used this is not necessary, as after the legs of the tripod have been firmly placed upon the ground all adjustments of the camera to bring it in proper position may be brought about by adjusting the sphere.

Having thus fully described my invention, what I claim as new and useful is—

In a device of the character described, lugs projecting both upward and downward from a disk having an opening therethrough, said lugs being curved on their inner faces to conform to the shape of a sphere, a sphere adapted to fit against said lugs, a rod secured in said sphere, said rod being adapted to engage slots formed in said lugs, a post projecting upward from the disk opposite one of the lugs said post having a screw-threaded hole formed in the post slanting downward, a thumb-screw journaled in said hole, a shoe swiveled thereto, said thumb-screw being diametrically opposite one of the lugs, as and for the purpose described.

In testimony whereof I have hereunto affixed my signature in the presence of two subscribing witnesses.

ALBERT H. LOEBS.

Witnesses:
S. S. WILLIAMSON,
H. B. HALLOCK.